June 14, 1938.  R. W. SHOEMAKER  2,120,843
PICKLING MACHINE
Filed Dec. 9, 1937  7 Sheets-Sheet 1

Inventor
Robert W. Shoemaker
By Prease and Bishop
Attorneys

Inventor
Robert W. Shoemaker
By Fraser and Bishop
Attorneys

June 14, 1938.   R. W. SHOEMAKER   2,120,843
PICKLING MACHINE
Filed Dec. 9, 1937   7 Sheets-Sheet 7

Inventor
Robert W. Shoemaker
By Fraase and Bishop
Attorneys

Patented June 14, 1938

2,120,843

UNITED STATES PATENT OFFICE 2,120,843

PICKLING MACHINE

Robert W. Shoemaker, Anderson, Ind., assignor to Agnes J. Reeves Greer, Morgantown, W. Va.

Application December 9, 1937, Serial No. 178,978

17 Claims. (Cl. 266—7)

The invention relates to pickling apparatus for pickling coils of metal strip, and more particularly to certain improvements upon the general type of pickling apparatus disclosed in Greer Patent No. 2,091,921 issued August 31, 1937.

Apparatus of the general character referred to comprises means for supporting the coils of metal strip upon mandrels which are rotated as they are progressed through the pickling and washing tanks whereby the coils are rotated as they pass through the pickling and washing solutions.

The pickling apparatus disclosed in the Greer patent involves a broadly new principle in the pickling of coils of metal, and in actual practice has been found to be more efficient than any pickling apparatus in present practice. However it has been found that the improvements disclosed and claimed in the present application greatly facilitate the pickling operation.

An object of the present invention is to provide positive means for rotating the mandrels, carrying the coils, as the mandrels are progressed along the tanks.

A further object is to provide sprockets upon the end portion of the mandrels, moving sprocket chains engaging these sprockets to move the mandrels forwardly, and fixed sprocket chains, or their equivalents, also engaging said sprockets to positively rotate the mandrels as they are moved forwardly.

Another object is to provide fixed sprocket chains upon the transfer and delivery arms, which transfer the mandrels and coils from tank to tank, these fixed chains engaging the sprockets upon the mandrels, causing the mandrels to rotate as they are moved and thus preventing the sliding of one end of a mandrel ahead of the other end thereof.

A further object of the invention is to provide a hinged gate portion in one of the mandrel supporting rails of the charging device, so that the mandrels may be quickly and easily inserted into the coils before they are charged into the pickling tank.

A still further object is to provide a hinged gate portion in one of the mandrel supporting rails of the delivery mechanism, whereby the mandrels may be quickly and easily removed from the coils after they have been delivered from the last washing tank.

Still another object is to provide an improved form of mandrel with adjustable flanges thereon, adapted to accommodate coils of various width, so as to prevent the coils from opening endwise, or sliding toward either end of the mandrels.

A further object is to provide a safety control mechanism at the entrance end of the pickling tank to prevent a coil from being charged therein until the preceding coil has moved a predetermined distance forward through the pickling tank.

A still further object of the invention is to provide a guide above the driving chains to prevent the chains from slipping or sliding over the sprockets upon the mandrels, whereby positive driving of the sprockets is assured.

Another object is to provide a back-spinner for opening the convolutions of the coils to a greater degree than can be obtained upon the recoiler, particularly where the coils are formed of long strips.

A further object is to locate such a back-spinner between the recoiler and the charging or loading mechanism whereby the recoiled coil may be transferred from the recoiler to the back-spinner and then to the loading device without slowing down the operation of the machine.

A still further object of the improvement is to provide a back-spinner which may be automatically operated to loosen or unwind the convolutions of a coil to such an extent that no part of the coil will contact with any other part thereof within the acid so as to completely eliminate the possibility of any dark spots or streaks upon the coil being caused by the pickling operation.

These objects together with others which will be apparent from the drawings and following description, or which may be later referred to, may be attained by constructing the improved pickling machine in the manner illustrated in the accompanying drawings, in which

Fig. 1d, a similar view of the transfer mechanism which transfers the coils from the second water tank to the coil discharging mechanism, the coil receiving cradle and mandrel supporting rails to which the coil and mandrels are transferred, and the up-ender and bumper by means of which the pickled and washed coils are discharged upon a conveyor or the like;

Fig. 13, an enlarged detail sectional elevation of a back-spinner of a slightly different form from that shown in Fig. 1a;

Similar numerals refer to corresponding parts throughout the drawings.

The improved pickling apparatus to which the invention pertains is of the same general construction as described in Greer Patent No. 2,091,921 with additions and improvements forming the subject matter of the present invention, and comprising generally the loose recoiler A, the back-spinner B, the coil charging mechanism C, the acid tank D, the transfer mechanism E between the acid tank and first water tank F, the transfer mechanism G between the first water tank and the second water tank H, the coil discharge mechanism I, and the up-ender J arranged in the sequence enumerated.

The loose coiler A may be of usual and well-known construction as illustrated and described in detail in the Greer patent above referred to, comprising a series of bending rolls through which the strip 15 is passed and coiled loosely into a coil 16, the convolutions of which are spaced from each other so that no portion of the coiled strip will contact with any other portion thereof while the coil is submerged in the pickling acid.

Figures 1A, 1B:
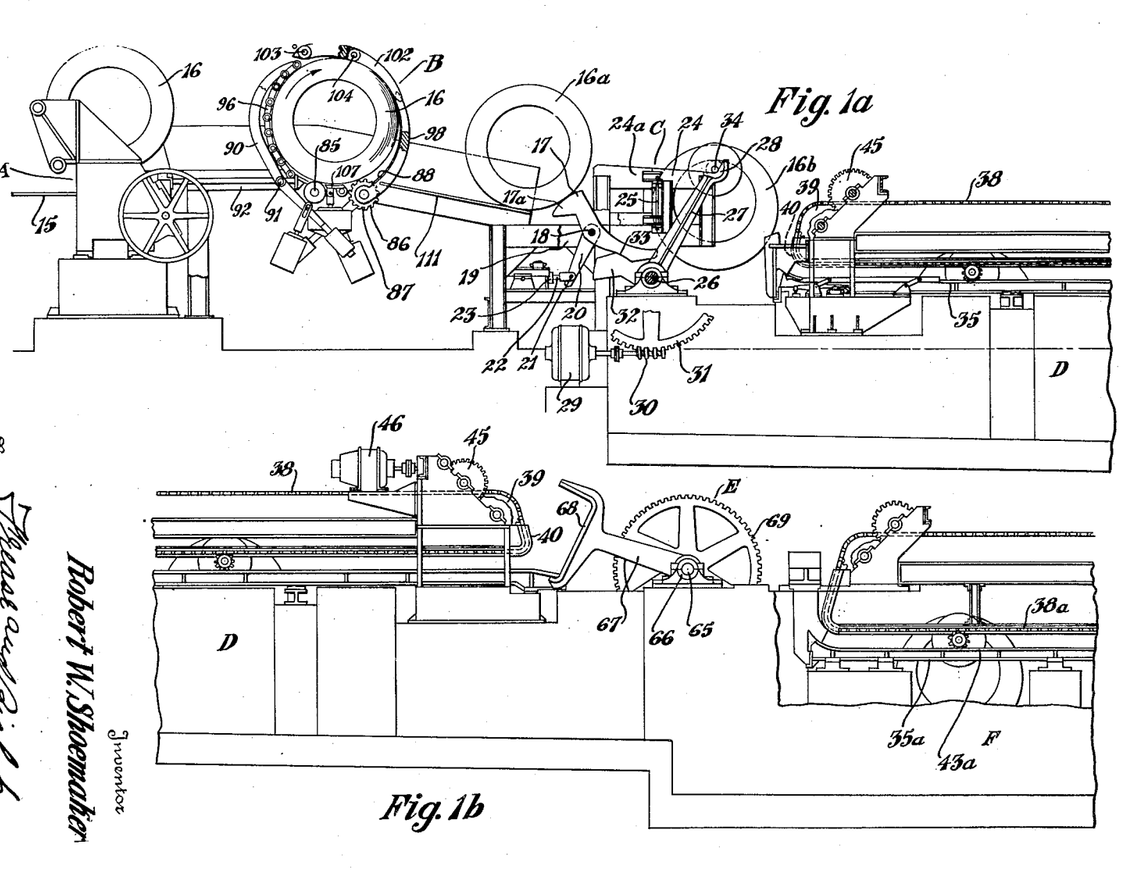
Figure 1a is a side elevation of the loose coiler, back-spinner, coil loading mechanism, and the entrance or charging end portion of the pickling tank.
Fig. 1b, a similar view of the discharge end portion of the pickling tank, the coil transfer mechanism which transfers the coils from the pickling tank to the first water tank, and the entrance end portion of the first water tank, with parts broken away for the purpose of illustration.

When the strip has been loosely recoiled upon the recoiler A it is transferred to the back-spinner shown generally at B in Fig. 1a which operates to loosen the convolutions of the coil to the desired extent.

This back-spinner includes a pair of carrier rolls 85 and 86 upon which the coil may be supported and rotated, either one or both of these carrier rolls being rotated by any suitable and well-known means for rotating the coil in the direction of the arrow shown in Fig. 1a.

In the form of back-spinner shown in this figure the carrier roll 86 is preferably of larger diameter than the roll 85 and is provided around its periphery with a plurality of spaced notches 87 adapted to receive the loose end 88 of the coil.

Figure 13:
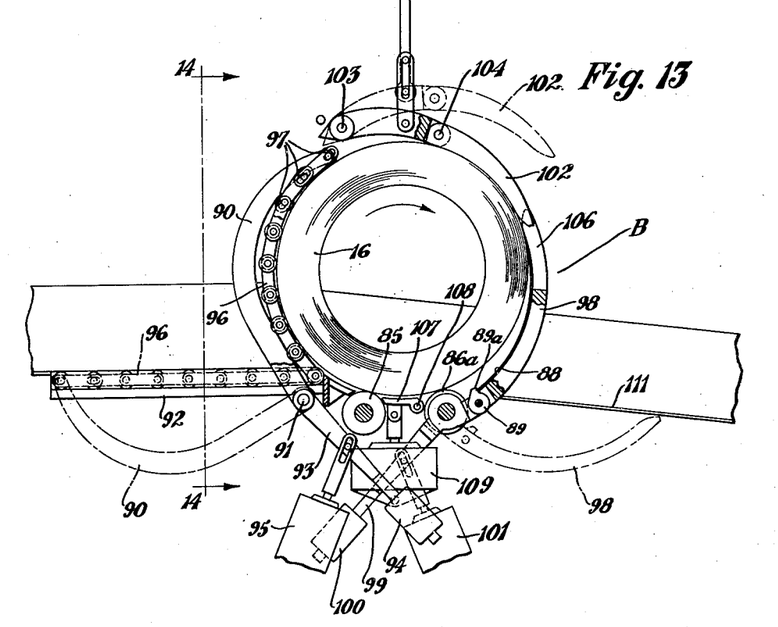
Figure 14:
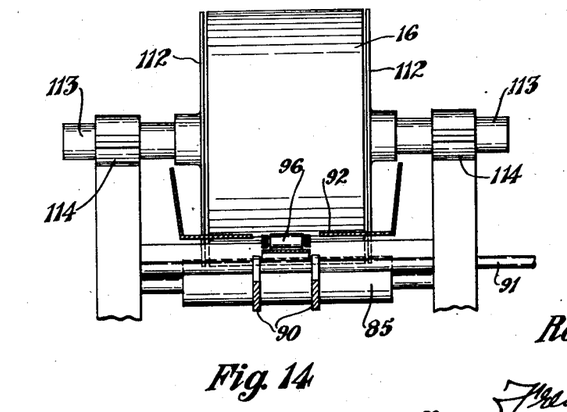
Fig. 14, a section taken as on the line 14—14, Fig. 13 showing the curved arms in lowered position.
Figure 15:
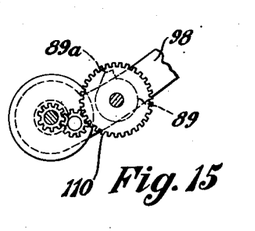
Fig. 15, a detail sectional elevation showing the means for automatically operating the coil end restraining roller or cam.

The form of back-spinner shown in Figs. 13 and 14 is exactly the same as that shown in Fig. 1a except that the carrier roll 86a may be of the same diameter as the roll 85 and is not provided with notches, an extra roll or cam 89 being located adjacent to the roll 86a for performing the function of the notches 87 in the roll 86. Therefore the two forms of the back-spinner may be otherwise described in detail as follows:

A spaced pair of curved arms 90 may be carried upon a rocker shaft 91 located below the platform 92, a depending rocker arm 93 being fixed to said rocker shaft and provided with a counter-weight 94 for normally raising the arms 90 to the position shown in Figs. 1a and 13. Any suitable means such as the fluid operated cylinder 95 may be provided for lowering the arms 90 to the position shown in broken lines in Fig. 13 and in full lines in Fig. 14.

A chain 96 is connected at one end to the free ends of the curved arms 90 and at its other end to a stationary portion of the apparatus such as the platform 92 at a point near the rocker shaft 91, this chain lying between the curved arms 90 and preferably provided with several slotted links near one end as shown at 97 in order to permit the chain to assume the straight position shown in broken lines in Fig. 13 and the arcuate position shown in full lines in said figure.

A curved arm 98 may be pivoted as upon the center of the carrier roll 86 or 86a as the case may be and provided with a depending portion 99 carrying a counter-weight 100 arranged to normally urge the arm upward toward the coil as shown in Figs. 1a and 13, a fluid operated cylinder 101, or other suitable and well-known means being provided for operating said arm.

The arm 98 may be of substantially the same length as the arms 90, but as shown in the drawings, in order to conserve space this arm may be of considerably less length so as to cooperate with a complementary arm 102 pivoted above the coil as at 103 and preferably having a hinged joint therein as indicated at 104.

The upper arm 102 may be operated by any suitable means such as the fluid operated cylinder 105. The free end of the arm 102 may be received within the bifurcated upper end 106 of the arm 98.

A lever or kicker 107 may be fulcrumed as at 108, below the coil and is adapted to be operated as by the cylinder 109. In order to transfer the coil from the recoiler to the back-spinner, the arms 90, 98 and 102 of the back-spinner are moved to the positions shown in broken lines in Fig. 13. The coil 16 may be then rolled over the platform 92 and chain 96 and deposited upon the carrier rolls.

The arms are then moved to the position shown in full lines in Figs. 1a and 13 and the carrier rolls are operated to rotate the coil in the direction of the arrow shown in each of the figures above referred to.

Considering first the operation of the form of back-spinner shown in Fig. 1a, with each revolution of the coil the loose end 88 thereof will follow the inner contour of the arm 98 and will engage in one of the notches 87 in the roll 86. This will cause the movement of this free end of the coil to be slowed up relative to the movement of the coil itself, thus tending to open the convolutions of the coil with each revolution thereof.

Assuming that the form of back-spinner shown in Fig. 13 is used, the free end 88 of the coil will engage the lug 89a upon the roller or cam 89. This roller or cam may be operated at a slower speed than the carrier roll 86 by means of gearing indicated generally at 110, or if desired, this roll or cam may be operated manually in order to withhold movement of the loose end of the coil the desired amount upon each revolution of the coil.

For the purpose of preventing end movement or telescoping of the coil while it is being rotated upon the back-spinner, a pair of side plates or disks 112 may be adjustably mounted so as to be positioned closely adjacent to but not touching the ends of the coil as shown in Fig. 14.

These side plates may be carried upon shafts 113 rotatable and slidably adjustable in the bearings 114 supported upon the frame of the machine in any suitable manner.

Thus as the coil is rotated upon the back-spinner any end movement or telescoping of the same in either direction will immediately bring the coil into contact with the adjacent side plate and since the side plates are rotatable this will not in any way slow up the movement of the coil.

After the coil has been properly loosened in the back-spinner, the arms 90, 98 and 102 are again moved to the broken line position shown in Fig. 13 and the cylinder 109 is operated to raise the free end of the lever or kicker 107 to discharge the coil onto the inclined platform 111, the coil rolling down said platform to the position shown at 16a in Fig. 1a, where it engages the stop 17 which is pivoted intermediate its ends as at 18 to the frame 19 and provided with the depending rocker arm 20 which may be pivotally connected, as at 21, to the plunger 22 of a hydraulic cylinder 23 or other mechanism for swinging said rocker arm upon the pivot 18.

The coil loading mechanism indicated generally at C and located beyond the back-spinner B includes the inclined rails 24 at which point a mandrel is inserted into each coil, the mandrel being supported upon the rails 24 and in turn supporting the coil thereon, as will be later described in detail.

Figure 9:
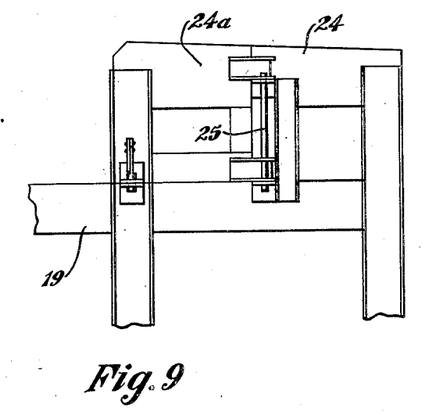
Fig. 9, an enlarged detail elevation of the coil loading mechanism showing the hinged gate for permitting the improved mandrel to be inserted into a coil.

In order to facilitate the insertion of the mandrel within the coil, a portion of one of the inclined rails 24 may be hinged as indicated at 24a and adapted to be swung outward upon the hinge 25 providing sufficient clearance to place the mandrel in position through the coil.

The loading or charging mechanism includes a rocker shaft 26 journaled in suitable bearings mounted upon the foundation of the machine and provided with the upwardly disposed arms 27 having the forked upper ends 28, any suitable means being provided for oscillating the shaft 26. This operating means is preferably in the form of a reversing motor 29 which drives a worm screw 30 meshing with a worm gear 31 fixed upon the shaft 26.

The rearwardly projecting foot 32 is fixed to the shaft 26 and normally located beneath the platform portion 33 of the stop 17. The upper surface of this platform curves upward at its forward end. In the operation of the charging mechanism, when the cylinder 23 is operated the stop 17 is rocked upon its pivot, lowering the depending rear end 17a thereof out of the path of the coil 16a and permitting the coil to roll onto the top surface of the stop, the upwardly curved forward end 33 thereof checking the forward movement of the coil.

A mandrel, such as generally indicated at 34 is then inserted through the open center of the coil, the gate 24a being first swung open upon its hinge 25 to provide sufficient clearance to permit the mandrel to be inserted longitudinally through the coil. The cylinder 23 is then operated in reverse direction swinging the stop 17 back into the position shown in Fig. 1a whereby the weight of the coil is transferred to the mandrel which is supported upon the rails 24 and thus rolls downward and forward upon these rails until the ends thereof are caught in the forked ends 28 of the loading arms 27, the coil being then in the position shown at 16b in Fig. 1a.

The pickling tank D is preferably located below the floor level as shown in the drawings and the rails 35 are mounted above the tank forming a track upon which the mandrels may be rotated throughout the length of the tank so that the coils suspended thereon may be rotated partially submerged in the acid. Each mandrel is provided with a curved roller 36 near each end and arranged to travel upon the corresponding rail 35.

A sprocket wheel 37 is also fixed upon each end portion of the mandrel and adapted to be engaged on its upper side by the endless drive chain 38 located over sprockets 39 at opposite ends of the tank and over the curved chain guides 40 located below the sprockets, and beneath the longitudinal chain guides 41 which insure engagement of the chain with the sprocket wheels 37. In order to provide for positively rotating the mandrels as they are carried forwardly along the rails 35, toothed tracks may be provided for engagement with the under sides of the sprocket wheels 37, and for the purpose of convenience these toothed tracks may be in the form of sprocket chains 42, of a construction similar to the chains 38, and mounted against longitudinal movement in the channel members 43 as by means of the pins 44 which are substituted at spaced intervals for the usual pins of the chain.

Figure 4:
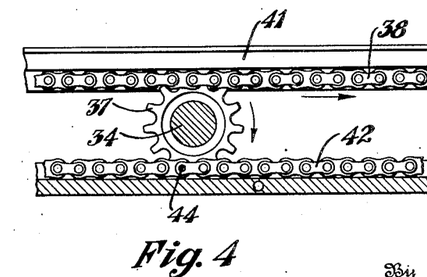
Fig. 4, a detail sectional view on a smaller scale taken substantially on the line 4—4, Fig. 3.

The drive chains 38 may be continuously driven in unison as by means of the gearing indicated at 45 and the motor 46, being driven in the direction of the arrow shown in Fig. 4 whereby the sprockets are positively rotated in the direction of the curved arrow shown in the same figure.

The downwardly and forwardly curved guide 47 provided with an upwardly and outwardly flared mouth, may be located near the entrance end of the acid tank adjacent to each of the drive chains 38 and arranged to receive the ends of the mandrels so as to guide the mandrels into position upon the curved ends 42a of the toothed tracks and beneath the lower strands of the chain 38 whereby the sprockets 37 upon the mandrels will engage said toothed tracks and drive chains and will be carried forwardly across the acid tank, being positively rotated as they are progressed, the coils suspended upon said mandrels being rotated by the rotation of the mandrels, each portion of each coil being alternately submerged in the acid and exposed to the atmosphere.

Figure 2:
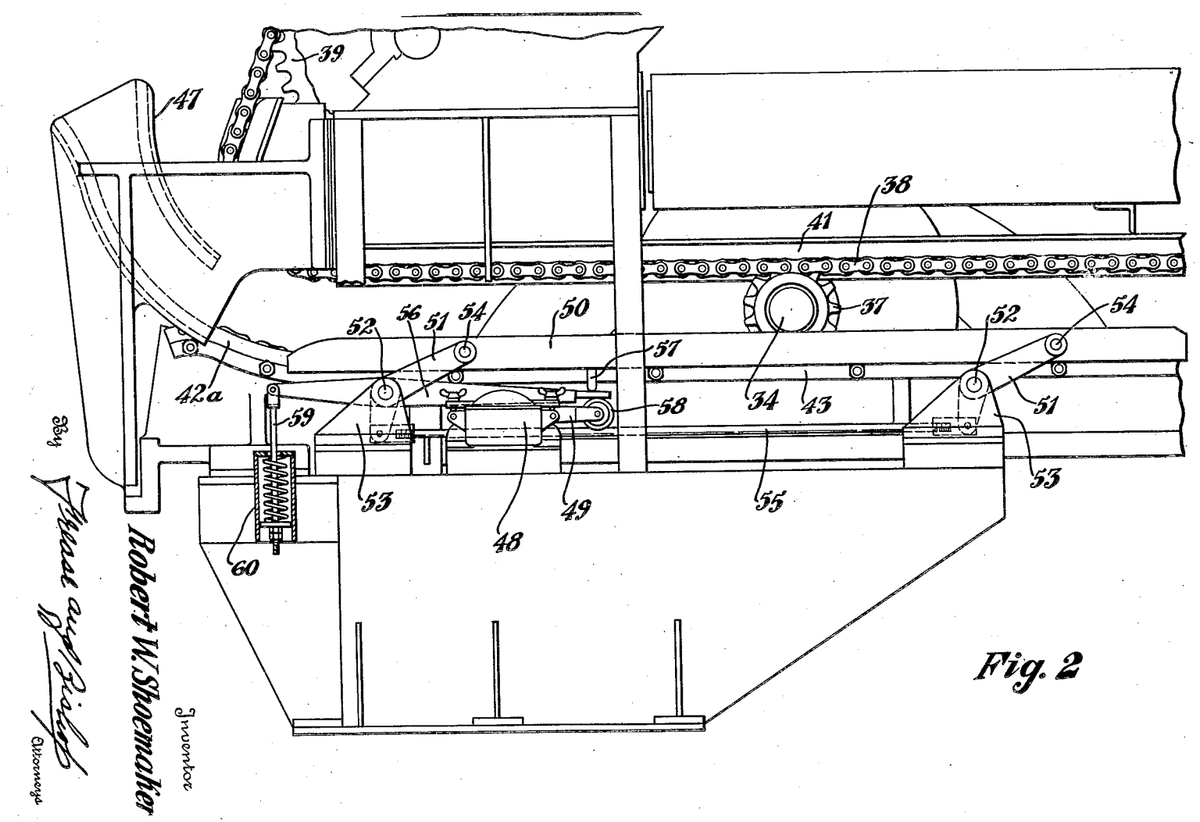
Fig. 2, a side elevation on a larger scale, of the entrance end portion of the acid tank showing the control mechanism which automatically controls the operation of the charging arms, parts being broken away for the purpose of illustration.
Figure 3:
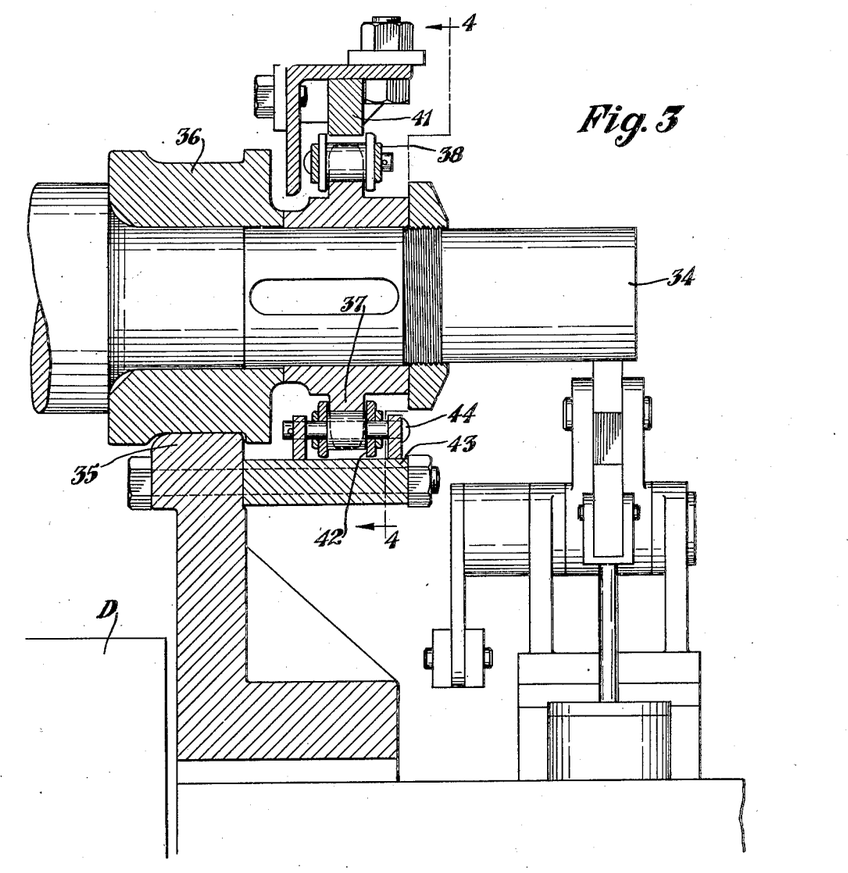
Fig. 3, a transverse sectional view upon an enlarged scale through the track and conveyor mechanism of the acid tank showing the charging arm control mechanism and the end portion of a mandrel.

For the purpose of controlling the operation of the motor 29 so as to prevent the charging arms 27 from delivering a coil into the pickling tank before the preceding coil has progressed a sufficient distance through the tank, a control mechanism is provided, which is illustrated in detail in Figs. 2 and 3 of the drawings.

A switch indicated generally at 48 is provided for controlling the reversing motor 29 and has a lever arm 49 for operating the switch. When this lever arm is in the lowered position, as shown in Fig. 2 the circuit to the reversing motor 29 is open through the switch 48 and when the arm 49 is in the raised or normal position the circuit through the switch 48 is closed so that the reversing motor 29 may be operated through a manually controlled switch, not shown in the drawings. An internal spring mechanism not shown, is provided for normally urging switch operating lever 49 to the raised position.

In order to operate the switch lever 49 by means of a mandrel passing over the track at the entrance end of the acid tank a floating rail 50 is located in the path of the adjacent end portion of the mandrel so as to be depressed thereby to the position shown in Fig. 2. This floating rail is carried upon a pair of bell-crank levers 51 fulcrumed intermediate their ends as at 52 upon suitable brackets 53, the upper ends of the bell-crank levers being pivoted to the floating rail 50 as at 54 and the lower ends thereof being pivotally connected together as by a link 55.

Interposed between the floating rail 50 and the switch operating lever 49 is a lever 56 fulcrumed at 52 and having one end located between the depending lug 57 upon the floating rail 50, and the roller 58 upon the switch operating lever 49, the other end of this lever being connected as by the depending link 59 with a spring operated dash pot 60 arranged to normally pull said last named end of the lever 56 downward.

From the above it will be obvious that as a mandrel 34 is charged into the acid tank it will immediately depress the floating rail 50 opening the switch 48 and holding the same open until the mandrel has passed beyond the rail 50 thus preventing the charging arms 27 from returning to the raised position shown in Fig. 1a to receive and charge the next mandrel and coil into the acid tank.

Figure 5:
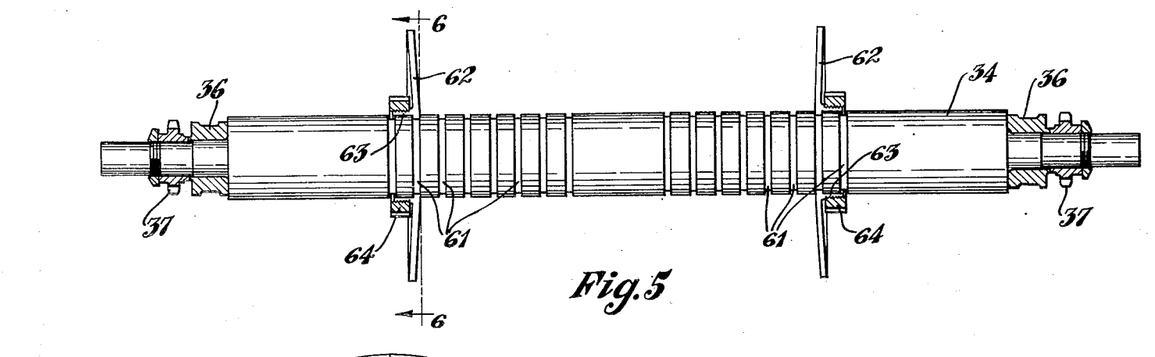
Fig. 5, an elevation of one of the improved mandrels with parts thereof shown in section.
Figure 6:
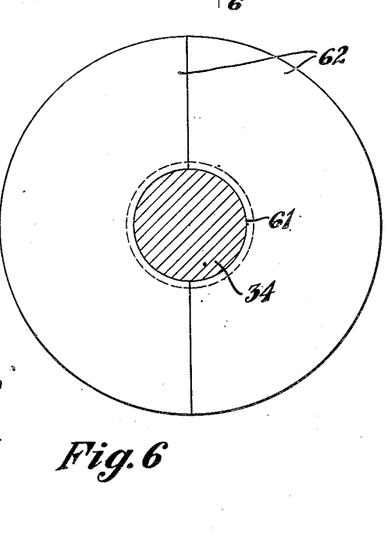
Fig. 6, an enlarged transverse sectional view through the mandrel taken as on the line 6—6, Fig. 5.

Each of the mandrels 34 is preferably provided with a spaced plurality of annular grooves 61 by means of which the split flanges 62 may be adjustably mounted to accommodate any desired width of coil to be pickled. The split flanges are each composed of two half round sections the inner edges of which are adapted to fit into any desired one of the grooves 61. A threaded curved flange portion 63 is formed upon each section and adapted to be engaged by a nut 64 for holding the flanges in adjusted position upon the mandrel. The flanges 62 are of sufficient diameter to prevent the coils from telescoping or shifting longitudinally upon the mandrel.

The transfer unit indicated generally at E is located between the pickling tank and the first water tank and includes a rocker shaft 65 journaled in bearing 66 and having fixed thereto the coil transfer arms 67 each of which is provided with a coil engaging hook 68 at its free end. The shaft 65 may be connected as through the gear 69 with any suitable drive mechanism for oscillating the shaft in order to swing the transfer arms 67 from the position shown in Fig. 1b, where the hooks 68 receive a mandrel and coil from the pickling tank, to a position where said mandrel and coil will be discharged from the transfer arms into the first water tank F.

Figure 1C:
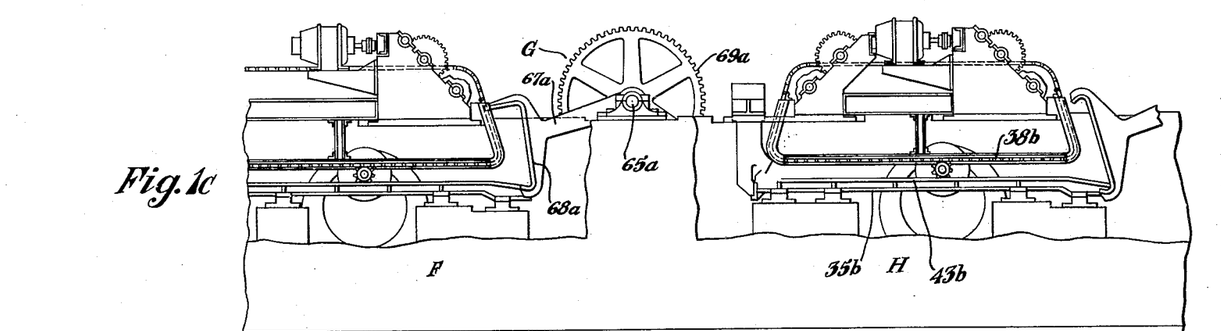
Fig. 1c, a similar view showing the discharge end portion of the first water tank, the transfer mechanism which transfers the coils from the first water tank to the second water tank, and the second water tank, parts being broken away for the purpose of illustration.

This water tank is preferably of greater width than the acid tank so as to receive the entire length of the mandrel therein and the rails 35a, toothed tracks or fixed chains located in the channels 43a, and drive chains 38a may all be of the same construction as the corresponding parts above described in connection with the acid tank, and as shown in Figs. 1b and 1c are all located within the washing tank whereby the entire coil may be submerged under the water as it is rotated and carried forwardly through the tank.

The transfer unit G which is located between the first water tank F and the second water tank H may be of the same construction as the transfer unit E above described comprising a rocker shaft 65a having the transfer arms 67a fixed thereto and provided with the hooks 68a, the shaft being provided with a gear 69a to which any suitable power means may be connected for oscillating the transfer arms to transfer the mandrels from the first water tank F to the second water tank H.

This second washing tank may be of the same construction as the tank F but is preferably of shorter length and is provided with the rails 35b, channel 43b containing the toothed tracks or fixed chains and the drive chains 38b all as above described.

At the discharge end of the second washing tank H is located another transfer unit similar to those above described and comprising the rocker shaft 65b having the transfer arms 67b provided with hooks 68b, a gear 69b upon said shaft engaging any suitable operating means for oscillating the transfer arms to carry a mandrel and coil from the discharge end of the second washing tank to the coil discharge unit I.

This discharge unit comprises a cradle 70 to receive the coil and a pair of inclined rails 71 to receive the mandrel. As the coil is deposited upon the cradle 70 the weight of the same is received by the cradle permitting the mandrel to freely roll down the inclined rails 71 into the notches 72 at the lower ends thereof.

Figure 10:
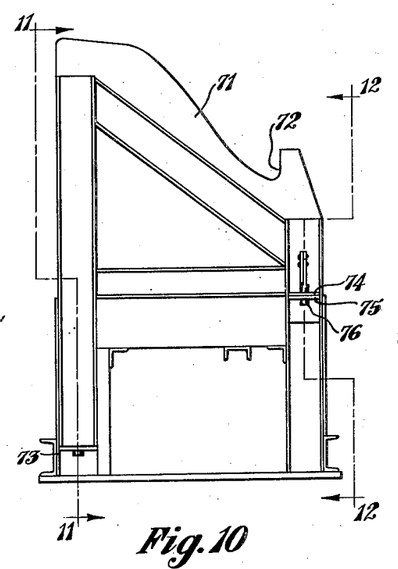
Fig. 10, a similar view of the discharge mechanism showing the hinged gate for permitting removal of the improved mandrel.
Figure 11:
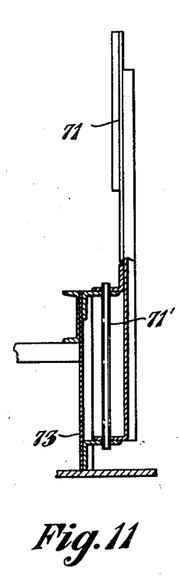
Fig. 11, a section taken as on the line 11—11, Fig. 10.
Figure 12:
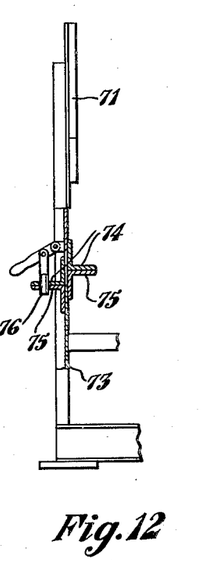
Fig. 12, a section taken as on the line 12—12, Fig. 10.

One of the inclined rails 71 is preferably hinged so as to be swung to one side providing a clearance to permit the mandrel to be withdrawn from the coil at this point. For this purpose the hinged rail 71 may be in the form of a gate hinged at one side as at 71' to the supporting frame 73 the swinging edge of the gate being provided with the angular flanges 74 adapted to fit upon corresponding flanges 75 formed on the frame structure 73, a suitable latch 76 being provided for normally holding the gate in closed position.

Figure 7:
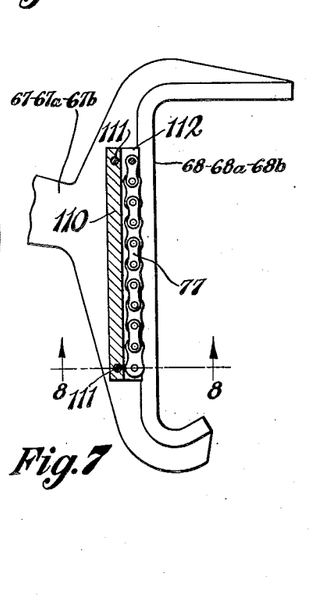
Fig. 7, a fragmentary elevation partly in section of one of the transfer arms showing the toothed tracks thereon.
Figure 8:
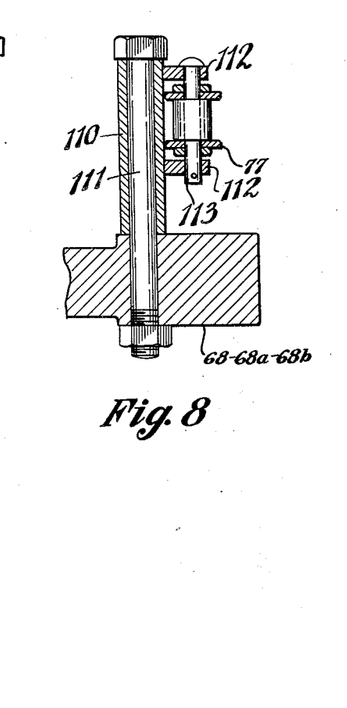
Fig. 8, an enlarged transverse sectional view taken as on the line 8—8, Fig. 7.

At this point attention is called to the fact that the hooks of the transfer arms 67a and 67b may be provided with toothed tracks or sections of fixed sprocket chain as shown at 77 in Figs. 7 and 8 for engagement with the sprockets of the mandrels so as to cause the mandrels to rotate and travel forward properly as they are transferred from one tank to another by the transfer arms. Preferably as shown in Fig. 7 these toothed tracks or fixed chains are of less length than the hooks, terminating at each end at a point spaced from the corresponding end of the hook.

The section of sprocket chain 77, may be located in a channel member fixed at one side of the hook 68, 68a or 68b of the transfer arm, this channel being shown in Figs. 7 and 8 at 110 and connected at its ends to the hook as by the bolts 111. A spaced pair of flanges 112 may be formed upon or fixed to the member 110 and the section of chain 77 is located between said flanges and fixed as by making certain of the pins of the chain longer than the width of the chain and extending them through the flanges 112, as clearly shown in Fig. 8.

After the mandrel has been removed from the coil the cradle 70 may be tilted upon its pivot 78 by means of the rocker arm 79 connected to the plunger 80 of the hydraulic cylinder 81 or other suitable operating means.

Figure 1D:
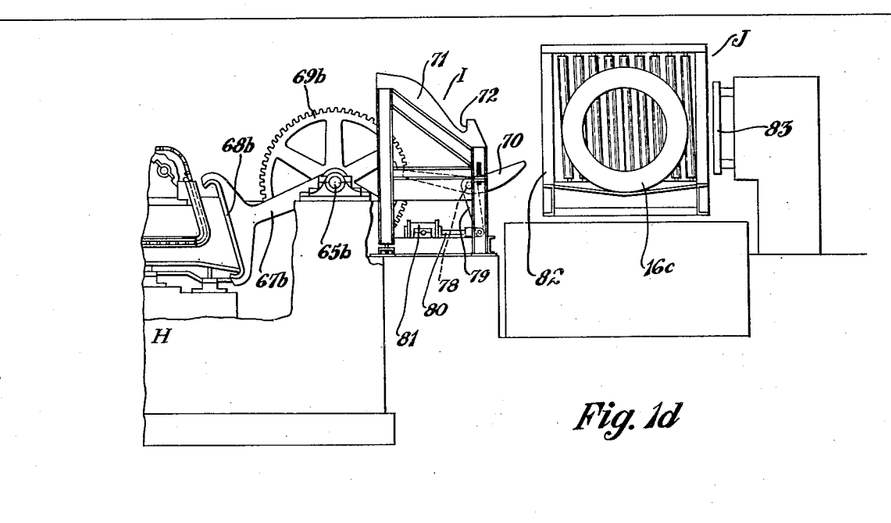

The coil is thus rolled onto the up-ender indicated generally at 82, assuming the position indicated at 16c in Fig. 1d, the bumper 83 receiving the impact of the coil and preventing it from rolling off of the up-ender which may then be operated in the usual and well-known manner to transfer the pickled and washed coil onto a conveyor or the like.

I claim:

1. Pickling apparatus for pickling a coil of metal including a tank containing liquid, toothed rails associated with the tank, a mandrel upon which the coil is supported, sprockets upon the mandrel adapted to engage said toothed rails, and drive chains for engagement with the sprockets for moving the mandrel over the toothed rails and rotating the mandrel as it is moved over the toothed rails whereby the coil is rotated and moved through the liquid.

2. Pickling apparatus for pickling a coil of metal including a tank containing liquid, tracks associated with the tank, a mandrel upon which the coil is supported, a toothed rail associated with the tank, a sprocket upon the mandrel adapted to engage said toothed rail, and a drive chain for engagement with the sprocket for moving the mandrel over the tracks and rotating the mandrel as it is moved over the tracks whereby the coil is rotated and moved through the liquid.

3. Pickling apparatus for pickling a coil of metal including a tank containing liquid, sprocket chains fixed against movement relative to the tank, a mandrel upon which the coil is supported, sprockets upon the mandrel adapted to engage said fixed chains, and drive chains for engagement with the sprockets at diametrically opposite points to the fixed chains for moving the mandrel over the fixed chains and rotating the mandrel as it is moved over the fixed chains whereby the coil is rotated and moved through the liquid.

4. Pickling apparatus for pickling a coil of metal including a tank containing liquid, a mandrel upon which the coil is supported, conveyor means for moving the mandrel along the tank whereby the coil is moved through the liquid, transfer arms for removing the mandrel and coil from the tank, toothed tracks upon the transfer arms, and toothed wheels upon the mandrel for engagement with said toothed tracks.

5. Pickling apparatus for pickling a coil of metal including a tank containing liquid, a mandrel upon which the coil is supported, sprockets upon the mandrel, drive chains for engagement with the sprockets for moving the mandrel along the tank and rotating the mandrel as it is moved, transfer arms at the discharge end of the tank for removing the mandrel and coil from the tank, and toothed tracks upon the transfer arms for engagement with the sprockets.

6. Pickling apparatus for pickling a coil of metal, including a tank containing liquid, a mandrel upon which the coil is supported, conveyor means for moving the mandrel along the tank and rotating the mandrel as it is moved along the tank, spaced flanges on the mandrel at the ends of the coil and extending radially above the top of the coil, the mandrel having spaced peripheral grooves and each flange being formed of two semi-circular portions adapted to selectively fit in said grooves and having threaded collar portions, and a nut for engagement with the threaded collar portions of each flange.

7. Pickling apparatus including a tank and means for charging coils into said tank, said charging means including a platform upon which the coils may be rolled forwardly, a stop member at the forward end of the platform in the path of the coils, inclined rails above the stop member adapted to support a mandrel located through each coil, one of said inclined rails being hingedly mounted and adapted to be swung upon its hinge to permit a mandrel to be longitudinally inserted into each coil, and charging arms for receiving the mandrel and charging the coil into the tank.

8. Pickling apparatus including acid and water tanks, means for passing a coil of metal suspended upon a mandrel through each of the tanks, a cradle beyond the last tank, spaced brackets above the cradle, and means for removing each mandrel and coil from the last tank and for placing the coil upon the cradle with the mandrel resting upon the brackets, one of the brackets being hinged and adapted to be swung upon its hinge to permit the mandrel to be withdrawn from the coil.

9. Pickling apparatus for pickling a coil of metal including a tank containing liquid, means for charging coils of metal suspended upon mandrels into the tank, means for moving each mandrel with a coil suspended thereon forwardly through the tank, and means operated by each mandrel as it is moved forwardly for preventing operation of the charging means until said last named mandrel has moved a predetermined distance forwardly.

10. Pickling apparatus for pickling a coil of metal including a tank containing liquid, charging arms for charging coils of metal suspended upon mandrels into the tank, a motor for operating said charging arms, a switch controlling the motor, means for moving each mandrel with a coil suspended thereon forwardly through the tank, and means operated by each mandrel as it is moved forwardly for holding the switch in open position until said last named mandrel has moved a predetermined distance forwardly.

11. Pickling apparatus for pickling a coil of metal including a tank containing liquid, charging arms for charging coils of metal suspended upon mandrels into the tank, a motor for operating said charging arms, a switch controlling the motor, means for moving each mandrel with a coil suspended thereon forwardly through the tank, and a floating rail adapted to be depressed by each mandrel as it is moved forwardly for holding the switch in open position until said last named mandrel has moved a predetermined distance forwardly.

12. Pickling apparatus for pickling a coil of metal including a tank containing liquid, a mandrel upon which the coil is supported, a track associated with the tank upon which the mandrel is supported, a sprocket upon the mandrel, a drive chain for engagement with the top of the sprocket for moving the mandrel over the track and rotating the mandrel as it is moved over the track, and a chain guide above said drive chain for holding the chain in engagement with the sprocket.

13. A back-spinner for loosening the convolutions of a coil of metal comprising carrier rolls for supporting and rotating the coil, means for engaging and momentarily retarding the movement of the loose end of the coil upon each revolution of the coil.

14. A back-spinner for loosening the convolutions of a coil of metal comprising carrier rolls for supporting and rotating the coil, and means associated with one of the carrier rolls for engaging and momentarily retarding the movement of the loose end of the coil upon each revolution of the coil.

15. A back-spinner for loosening the convolutions of a coil of metal comprising carrier rolls for supporting and rotating the coil, means for engaging and momentarily retarding the movement of the loose end of the coil upon each revolution of the coil, and curved arms adapted to substantially encircle the coil.

16. A back-spinner for loosening the convolutions of a coil of metal comprising carrier rolls for supporting and rotating the coil, means for engaging and momentarily retarding the movement of the loose end of the coil upon each revolution of the coil, curved arms adapted to substantially encircle the coil, and a flexible chain connected to one of said arms for contact with the coil.

17. A back-spinner for loosening the convolutions of a coil of metal comprising carrier rolls for supporting and rotating the coil, means for engaging and momentarily retarding the movement of the loose end of the coil upon each revolution of the coil, and rotatable side plates at each side of the coil.

ROBERT W. SHOEMAKER.